March 27, 1928.

F. A. STEVENS 1,664,094

SPECTACLE TEMPLE AND METHOD OF MAKING THE SAME

Original Filed July 22, 1921

Inventor:
Frederick A. Stevens.
by David Rines
Attorney:-

Patented Mar. 27, 1928.

1,664,094

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE AND METHOD OF MAKING THE SAME.

Original application filed July 22, 1921, Serial No. 486,703. Divided and this application filed November 9, 1923. Serial No. 673,748.

This application is a division of a copending application, Serial No. 486,703, filed July 22, 1921.

The present invention relates to spectacle temples of the combined-metal-and-non-metallic type, and to methods of making the same, and it has for its object to provide a new and improved temple of the said type that shall be more efficient, more durable, neater and of simpler construction than any heretofore proposed.

With this end in view, the invention consists of the improved spectacle temple and method of making the same a preferred embodiment of which is hereinafter described, illustrated in the accompanying drawings, and defined in the appended claims.

Figure 1:
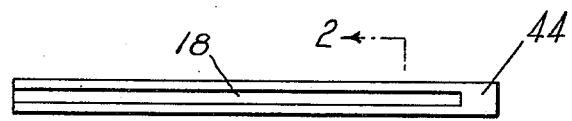
Figure 2:
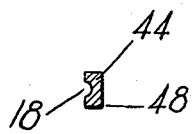
Figure 3:
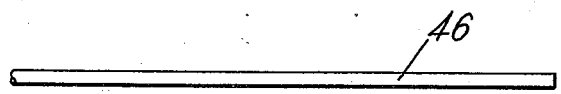
Figure 4:
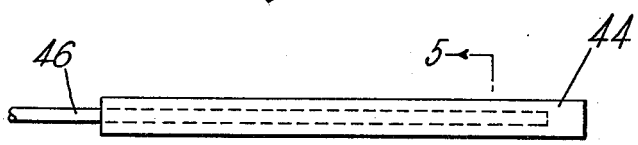
Figure 5:
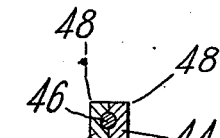
Figure 6:
Figure 7:
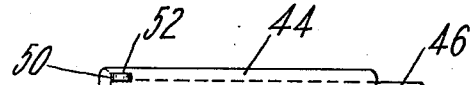
Figure 8:
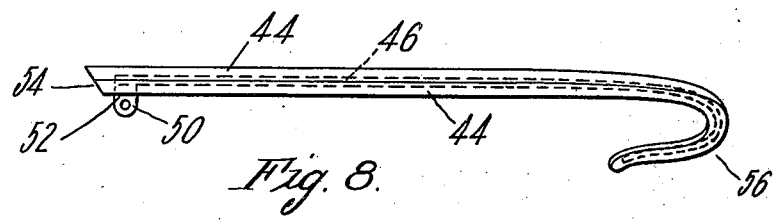

In the drawings, Fig. 1 is a view of a non-metallic sheet intended for use in the manufacture of a temple according to the present invention; Fig. 2 is a section taken upon the line 2—2 of Fig. 1, looking in the direction of the arrows; Fig. 3 is a fragmentary view of a metal reinforcing element before assembly with the non-metallic sheets; Fig. 4 is a fragmentary view of the reinforcing element shown in Fig. 3 assembled with two non-metallic sheets of the character shown in Figs. 1 and 2; Fig. 5 is a section taken upon the line 5—5 of Fig. 4; Fig. 6 is a view similar to Fig. 5 of a modification; and Figs. 7 and 8 are views of another modified temple.

To prevent warping, bending, breaking, etc., the temple is reinforced by a reinforcing part, or parts, preferably of metal. It is preferred to employ a metal rod 46. The reinforcing rod 46 is shown terminally provided integrally with an end piece 50, whereby the temple may be connected to a lens frame without using separate hinges. The non-metallic element of the temple comprises two portions 44, one of which is shown in Figs. 1 and 2 in the form of a non-metallic sheet, provided with a groove or grooves 18, to receive the reinforcing rod 46. The sheets need not be of the same thickness, and more than two sheets may be employed, if desired. The grooves 18 are of the same shape as the reinforcing rod, preferably round in cross section. The reinforcing rod 46 and the non-metallic sheets 44 are integrally united together in any desired manner, as by the use of pressure and previously applied cement. The result is a spectacle temple formed of non-metallic, flat sheets with a metal reinforcing rod between them.

It is not essential that any of the non-metallic sheets be previously provided with the metal receiving grooves 18. The reinforcing rod may be placed in position between ungrooved sheets, and the parts may be molded together in any desired way, as by means of dies, with the aid of heat, pressure and cement. It is preferred, however, to use grooved sheets, as the use of heat is usually undesirable in connection with such non-metallic substances as zylonite and the like.

If the sheets 44 are sharp-cornered, the resulting temple will be oblong or square in cross section, as will be understood from Fig. 5. The corners 48 may be cut away, to produce the round temple shown in Fig. 6; or the sheets 44 may be semi-circular in cross section to start with.

The rod 46 may be considerably longer than the sheets 44 if the forward part of the temple rod is intended to be exposed, as shown in Fig. 4. If it is desired that the temple have throughout the appearance of the non-metallic material, the reinforcing rod may be completely concealed, as will be understood from Figs. 7 and 8. In the latter event, the end piece 50 may extend through an opening 52 in one of the sheets 44, and the non-metallic portion of the temple may be beveled just forward of the end piece 50, as shown at 54, to constitute a stop for limiting the pivotal movement of the temple. The beveling may be formed before or after the sheets have been assembled with the reinforcing rod.

The temple is completed by bending its rear portion into the desired shape, as shown at 56; or the metal and the non-metallic elements 44 and 46 may previously be properly shaped to start with, so as to avoid the necessity of the final bending step.

It will be appreciated that the invention is not restricted to the exact embodiments thereof that are herein illustrated and described, as modifications may be made by persons skilled in the art without departing from its spirit and scope. It is therefore desired that the above description be regarded as illustrative and not restrictive, and that the invention be considered as defined in the appended claims.

What is claimed as new is:

1. A spectacle temple comprising non-metallic sheets integrally united together with a reinforcing rod between them, the rear portion of the temple being bent to the shape of a temple, and the temple having a hinge member at the forward end.

2. A spectacle temple comprising non-metallic sheets integrally united together with a reinforcing rod between them, the reinforcing rod having an end piece projecting through one of the non-metallic sheets at the forward end of the temple, and the rear portion of the temple being bent to the shape of a temple.

3. A spectacle temple comprising non-metallic sheets integrally united together with a reinforcing rod between them, the reinforcing rod having an end piece projecting through one of the non-metallic sheets at the forward end of the temple, the temple being beveled forward of the end piece to constitute a stop for limiting the pivotal movement of the temple, and the rear portion of the temple being bent to the shape of a temple.

4. The method of making a spectacle temple that comprises inserting a reinforcing rod the rear portion of which is bent to the shape of a temple between correspondingly shaped non-metallic sheets, and integrally uniting the reinforcing rod and the non-metallic sheets together.

5. The method of making a spectacle temple that comprises grooving a non-metallic sheet, inserting a reinforcing rod in the groove, assembling the sheet with one or more non-metallic sheets, integrally uniting the reinforcing rod and the non-metallic sheets together, and bending the rear portion of the temple to the shape of a temple.

6. The method of making a spectacle temple that comprises correspondingly grooving and cementing non-metallic sheets, inserting a reinforcing rod the forward end of which is provided with an end piece in the groove of one of the sheets, providing the other sheet with an opening at the forward end, mounting the said other sheet over the one sheet so that the reinforcing rod shall lie also in the groove of the other sheet and the end piece shall project through the opening, integrally uniting the sheets and the rod together, and bending the rear portion of the temple to the shape of a temple.

7. The method of making a spectacle temple that comprises inserting a reinforcing rod between non-metallic sheets, integrally uniting the reinforcing rod and the non-metallic sheets together, and bending the rear portion of the united-together sheets with the reinforcing rod between them to the shape of a temple.

8. A temple for an ophthalmic mounting, comprising a composition body consisting of two sections having their adjacent faces provided with registering grooves, a metal temple core received in said grooves, and means for securing together the two sections.

9. A temple of the character described comprising nonmetallic members grooved on one surface, said grooved surfaces being joined together, and a metallic core embedded in the grooves and having a hinge butt extending beyond the end of the non-metallic members.

10. The process of producing a temple for an ophthalmic mounting, consisting in forming a metal receiving groove in each of two sheet-material portions, inserting a metal member within the groove, uniting the two portions, and subsequently shaping the united parts into final form.

11. The process of producing a temple for an ophthalmic mounting, consisting in forming a metal-receiving groove in a sheet-material portion, inserting a metal member within the groove, assembling the portion with a separate member of material corresponding to the first portion to close the groove, and subsequently shaping the temple blank into the completed article.

12. The process of producing a temple for an ophthalmic mounting, consisting in forming a metal receiving groove in a sheet-material portion, inserting a metal member within the groove, assembling the portion with a separate complementary portion to close the groove, and subsequently shaping the temple into the completed article.

13. A spectacle temple having a forward portion at which the temple is adapted to be hinged to a lens-holding front and a rear portion bent to the shape of a temple, the temple comprising two non-metallic members extending longitudinally throughout the forward portion and the rear portion and integrally united together, the temple being reinforced by a reinforcing rod extending substantially throughout the forward portion and the rear portion.

In testimony whereof, I have hereunto subscribed my name this 5th day of November, 1923.

FREDERICK A. STEVENS.